(12) United States Patent
Zhao et al.

(10) Patent No.: US 12,102,986 B2
(45) Date of Patent: Oct. 1, 2024

(54) CATALYST FOR PROPANE DEHYDROGENATION TO PROPYLENE

(71) Applicant: UOP LLC, Des Plaines, IL (US)

(72) Inventors: Xi Zhao, Arlington Heights, IL (US); Avram M. Buchbinder, Chicago, IL (US); J. W. Adriaan Sachtler, Des Plaines, IL (US); Wei Pan, Hoffman Estates, IL (US); John A. Karch, Lake Zurich, IL (US)

(73) Assignee: UOP LLC, Des Plaines, IL (US)

( * ) Notice: Subject to any disclaimer, the term of this patent is extended or adjusted under 35 U.S.C. 154(b) by 203 days.

(21) Appl. No.: 17/838,063

(22) Filed: Jun. 10, 2022

(65) Prior Publication Data

US 2023/0026153 A1     Jan. 26, 2023

Related U.S. Application Data

(60) Provisional application No. 63/222,183, filed on Jul. 15, 2021.

(51) Int. Cl.
| | | |
|---|---|---|
| *B01J 23/62* | (2006.01) | |
| *B01J 35/61* | (2024.01) | |
| *B01J 37/02* | (2006.01) | |
| *C10G 29/04* | (2006.01) | |

(52) U.S. Cl.
CPC ............ *B01J 23/62* (2013.01); *B01J 35/613* (2024.01); *B01J 37/0209* (2013.01); *C10G 29/04* (2013.01); *B01J 2523/32* (2013.01); *B01J 2523/828* (2013.01); *C10G 2300/1081* (2013.01); *C10G 2300/1096* (2013.01)

(58) Field of Classification Search
CPC ... B01J 23/62; B01J 29/84; B01J 29/87; B01J 35/613; B01J 37/0209; B01J 2523/32; B01J 2523/828; C10G 29/04; C10G 2300/1081; C10G 2300/1096; Y02P 20/52
See application file for complete search history.

(56) References Cited

U.S. PATENT DOCUMENTS

| | | | |
|---|---|---|---|
| 4,629,717 A | 12/1986 | Chao | |
| 8,653,317 B2 | 2/2014 | Pierce et al. | |
| 9,364,815 B2 | 6/2016 | Kauffman et al. | |
| 9,884,314 B2 | 2/2018 | Luo et al. | |
| 10,016,750 B1 * | 7/2018 | Al-Khattaf | ............... B01J 29/40 |
| 2010/0125160 A1 * | 5/2010 | Rekoske | ............... C07C 5/2754 |
| | | | 585/477 |
| 2019/0232255 A1 | 8/2019 | Jo et al. | |

FOREIGN PATENT DOCUMENTS

| | | | |
|---|---|---|---|
| CN | 106040271 A | 7/2018 | |
| WO | 2016064590 A1 | 4/2016 | |
| WO | WO-2020061012 A1 * | 3/2020 | ............ B01J 23/468 |

OTHER PUBLICATIONS

Search Report and Written Opinion for PCT/US2022/073724, dated Nov. 7, 2022.
Sahar Nazer, "Surface modification of alumina with P2O5 and its application in 2-octanol dehydration", Jan. 9, 2020.
A.L. Lapidus et al., Dehydrogenation of C4-C5-Paraffins over Platinum Catalysts, N.D. Zelinsky Institute of Organic Chemistry, Russian Academy of Sciences, Moscow, Russia, DGMK-Conference, Munich, 2004, 201-208.

* cited by examiner

*Primary Examiner* — Brian A McCaig
(74) *Attorney, Agent, or Firm* — Paschall & Associates, LLC; Mark Goldberg

(57) ABSTRACT

A de-hydrogenation catalyst and its use in dehydrogenation of hydrocarbons. The catalyst has low cracking activity and comprises gallium or gallium and platinum on an essentially non-acidic and amorphous alumina-phosphate or silica-alumina-phosphate support with an empirical chemical composition of $[Al_2O_3][SiO_2]_Y[P_2O_5]_Z$, wherein Y is between 0 and 0.2 and Z is between 0.01 and 1.1, with a BET surface area above 50 m²/g, as measured by N2 adsorption experiment.

16 Claims, No Drawings

CATALYST FOR PROPANE DEHYDROGENATION TO PROPYLENE

This application claims priority from provisional application 63/222,183 filed Jul. 15, 2021 which is incorporated herein in its entirety.

This invention generally relates to the field of hydrocarbon conversion and particularly to the dehydrogenation of paraffinic hydrocarbons to olefinic hydrocarbons, and/or lower alkylaromatic hydrocarbons to vinyl aromatic hydrocarbons. In several preferred embodiments, the invention relates to the dehydrogenation of lower alkanes, for example ethane, propane, isobutane and butanes to their corresponding olefins, for example ethylene, propylene and butylenes; and/or to the dehydrogenation of lower alkylaromatic hydrocarbon compounds, for example ethylbenzene, propylbenzene and methylethylbenzene to their corresponding vinyl aromatic (that is "alkenylaromatic") hydrocarbon compounds, for example styrene, cumene and alpha-methyl styrene, respectively. More particularly, this invention relates to improved catalysts for alkane dehydrogenation including novel supported catalysts used for the catalytic dehydrogenation of paraffinic hydrocarbons to olefinic hydrocarbons, and/or lower alkylaromatic hydrocarbons to vinyl aromatic hydrocarbons.

The dehydrogenation of hydrocarbons is an important commercial process because of the great demand for dehydrogenated hydrocarbons for the manufacture of various chemical products such as detergents, high octane gasolines, pharmaceutical products, plastics, synthetic rubbers, and other products well known to those skilled in the art. One example of a dehydrogenation process is in the dehydrogenating of isobutane to produce isobutylene which can then be polymerized to provide tackifying agents for adhesives, viscosity-index additives for motor oils, impact-resistant and anti-oxidant additives for plastics and a component for oligomerized gasoline. Another example of this process is dehydrogenating propane to produce propylene which can be polymerized to produce polypropylene or used for other applications.

In current propane dehydrogenation processes, the overall propane conversion and propylene yield is greatly limited by thermal balance and has limited room of improvement due to thermal cracking during long hot residence times in inter-stage heaters. An improved process, where circulating catalyst instead of feed stream is heated and provides thermal energy for the dehydrogenation reaction, could decouple thermal cracking from heat source and offer higher catalytic conversion of propane to propylene. This improved process requires a catalyst that provides a high selectivity to propylene, stability at high temperatures (above 700 C), straight forward regeneration or reactivation without cooldown steps and a low manufacturing cost. A catalyst has now been developed that achieves these criteria and provides equal or better performance than prior art catalysts.

SUMMARY OF THE INVENTION

A de-hydrogenation catalyst is provided that has low cracking activity. The catalyst comprises gallium on an essentially non-acidic and amorphous alumina-phosphate or silica-alumina-phosphate support comprising an oxide with an empirical chemical composition of $[Al2O3][SiO2]_Y[P2O5]_Z$, in which Y is between 0 and 0.2 and Z is between 0.01 and 1.1, with a BET surface area above 50 m²/g, as measured by N2 adsorption experiment. The catalyst may further comprise platinum. The catalyst may comprise 0.05- 2.5 wt % gallium. When platinum is present, the catalyst comprises 1 to 500 ppm by weight platinum. Preferably, the catalyst comprises about 0.25 to 1.5 wt % gallium and about 20 ppm to 100 ppm by weight platinum. When platinum is present, the catalyst has an atomic ratio of Ga/Pt between 140 and 4500 and preferable between 200 and 500.

Also, provided is a method of preparing the catalyst of claim 2 comprising impregnating an alumina-phosphate or silica-alumina-phosphate support with a solution containing gallium and platinum. In another embodiment, the method comprises separate steps of impregnating gallium containing solution and platinum containing solution on the alumina-phosphate or silica-alumina-phosphate support.

In another embodiment is provided a process for dehydrogenating a hydrocarbon comprising contacting a gaseous stream consisting of at least one dehydrogenatable hydrocarbon selected from paraffinic hydrocarbons having from 2 to 20 carbons, alkylaromatic hydrocarbons having from 8 to 20 carbons, and mixtures thereof, hydrogen produced in situ by the dehydrogenation and a carrier fluid selected from the group consisting of one of the reactants in gaseous form, nitrogen, volatile hydrocarbons, carbon dioxide, and argon; or (b) at least one dehydrogenatable hydrocarbon selected from paraffinic hydrocarbons having from 2 to 20 carbons, alkylaromatic hydrocarbons having from 8 to 20 carbons, and mixtures thereof and hydrogen produced in situ by the dehydrogenation, in a dehydrogenation reactor with a supported dehydrogenation catalyst comprising gallium on an essentially non-acidic and amorphous alumina-phosphate or silica-alumina-phosphate support with the empirical chemical composition of $[Al2O3][SiO2]_Y[P2O5]_Z$, in which Y is between 0 and 0.2 and Z is between 0.01 and 1.1

DETAILED DESCRIPTION

A catalyst that has been found to be highly useful for the current invention has an amorphous and essentially non-acidic alumina-phosphate or silica-alumina-phosphate support that has a high mesoporosity with typical BET surface area of 120 m²/g or higher. By "essentially non-acidic", it is meant that the support showed no appreciable adsorption of ammonia in temperature-program desorption (TPD) experiments beyond background level originating from physisorption at low temperature. The BET surface area can be measured according to standard N2 adsorption experiments, such as the procedure described in ASTM method 3663. A suitable support has a typical Al to P atomic ratio between 0.9 and 100, and more preferably, between 0.9 and 1.2. When silica is also incorporated with alumina-phosphate, the preferred atomic ratio of Si to Al is between 0 and 0.1. U.S. Pat. Nos. 4,629,717 and 5,139,989, both assigned to the present applicant and the entirety of both incorporated herein by reference, describe one of many possible processes of making a satisfying support. The support made following referenced procedure can be used as prepared after standard finishing (which may include aging, and NH4+ ion exchange, and drying) or calcined to remove excess volatile component and moisture before impregnation of gallium and optionally platinum. The support remains amorphous in XRD pattern before and after the calcination, with no peaks and only broad background. In general, improved activity was found with catalysts that were calcined before impregnation. The gallium and optionally platinum can be added to the support by excess solution or incipient wetness impregnation or by other methods. Gallium and/or platinum could also be incorporated directly during the support forming process. When both gallium and platinum are added, they can be introduced in any order (either gallium followed by platinum, or vice versa), with or without an activation steps in-between, or both metals can be introduced together. The gallium source may be gallium nitrate, or gallium chloride, or a coordination complex between gallium ion and one or more organic ligand, such as ethylenediaminetetraacetic acid (EDTA), or any other compounds containing gallium, or their mixture. The platinum may be in solution of tetraamineplatinum nitrate, tetraamineplatinum chloride, or any other soluble platinum compounds, including their mixtures. After loading of the metal onto the support, the catalyst may be calcined in wet or dry air at temperatures of about 600° C. to about 900° C., preferably about 700 C to 750 C, for a period of about 1 hours to about 4 hours to decompose the volatile components in metal compound and to activate the catalyst. The Ga or Pt metal is atomically dispersed on the support with the typical level of Ga about 0.7-2.2 wt % and a typical level of platinum is 50-100 ppmw. It was found that both types of catalysts, i.e., gallium on alumina-phosphate or silica-alumina-phosphate support, and platinum/gallium on alumina-phosphate or silica-alumina-phosphate support, were highly selective to propylene and hydrogen in a propane dehydrogenation reaction with virtually no side-reactions without requirement of additional treatment or component (i.e. alkali metal) for cracking attenuation.

According to one or more embodiments, the catalyst composition is used in a hydrocarbon conversion process, such as dehydrogenation. In the preferred process, dehydrogenatable hydrocarbons are contacted with the catalytic composition of the present invention in a dehydrogenation zone maintained at dehydrogenation conditions. This contacting may be accomplished by using the catalyst in a fixed bed system, a moving bed system, a fluidized bed system, or in a batch type operation; however, it is preferred to use a fluidized bed system. The dehydrogenation zone may itself comprise one or more separate reaction zones. The heat required for the endothermic dehydrogenation reaction is primarily provided by the sensible heat of the catalyst that is transferred from the regeneration zone to the reaction zone, although a portion of the heat for the dehydrogenation reaction can come from pre-heating the hydrocarbon feed or preheating a diluent gas. It is to be noted that the reactants may be in the liquid phase, a mixed liquid-vapor phase, or a vapor phase when they contact the catalyst with best results obtained in the vapor phase.

The hydrocarbon to be converted is preferably an alkane. The alkane is preferably a light alkane such as propane or butane. In an exemplary embodiment the alkane is propane. Hydrocarbons which may be dehydrogenated include dehydrogenatable hydrocarbons having from 2 to 30 or more carbon atoms including paraffins, alkylaromatics, naphthenes, and olefins. One group of hydrocarbons which can be dehydrogenated with the catalyst is the group of paraffins having from 2 to 30 or more carbon atoms. The catalyst is particularly useful for dehydrogenating paraffins having from 3 to 18 or more carbon atoms to the corresponding mono-olefins. The catalyst is especially useful in the dehydrogenation of C2-C6 paraffins, primarily propane and butanes, to mono-olefins. While particularly suitable for dehydrogenating propane, the inventive process employing the inventive catalysts may be used for dehydrogenating other alkanes, including ethane, butane, and pentane to their respective alkenes (e.g., to ethylene, when the alkane being dehydrogenated is ethane). The resulting alkene (e.g., propylene, ethylene or butylene) has utility as, for example, a monomer in polymerization processes to produce products including, but not limited to, polyethylene, polypropylene, and ethylene-propylene copolymers.

Dehydrogenation conditions include a temperature of from about 400° to about 900° C., and preferably from 550 to 680° C., more preferably 600 to 640° C., a pressure of from about 0.01 to 10 atmospheres absolute, preferably 0.1 to 3 atmospheres absolute, more preferably 0.75 to 1.5 atmospheres absolute, and a weight hourly space velocity (WHSV) of from about 0.1 to 100 hr-1, preferably 0.5 to 5 hr-1. Generally, for normal paraffins, the lower the molecular weight, the higher the temperature required for comparable conversion. The pressure in the dehydrogenation zone is maintained as low as practicable, consistent with equipment limitations, to maximize the chemical equilibrium advantages.

The following examples are introduced to further describe the catalyst and process of the invention. These examples are intended as an illustrative embodiment and should not be considered to restrict the otherwise broad interpretation of the invention as set forth in the claims appended hereto.

EXAMPLE 1

11.92 g of $Ga(NO_3)_3$ aqueous solution (at 6.4 wt % Ga), 3.30 g of EDTA, and 3.05 g ammonium hydroxide solution (at 29 wt %) were mixed with 107.78 g $H_2O$. An additional 4.31 g of ammonium hydroxide solution is added to adjust the solution pH to 9.3 at 25° C. The solution was loaded in a small rotary evaporator, and 75.65 g of amorphous alumina phosphate support (with BET surface area of 283 $m^2/g$ and Al/P atomic ratio of 1.20) was added into the solution. The rotary evaporator rotated for 30 minutes at room temperature, followed by drying with jacketed ambient-pressure steam. The dried material was calcined in wet air containing 20% steam for 2 hours at 607 C. The catalyst is designated Catalyst A with 1 wt % Ga on alumina-phosphate.

EXAMPLE 2

Another catalyst was prepared by calcining Catalyst A further in dry air at 750° C. for 4 hours. The resulting catalyst is designated Catalyst B.

EXAMPLE 3

Yet another catalyst was prepared by calcining Catalyst A further in dry air at 900° C. for 4 hours. The resulting catalyst is designated Catalyst C.

EXAMPLE 4

0.232 g of 0.15 wt % Pt solution prepared from $Pt(NH_3)_4(NO_3)_2$ was mixed with 3.109 g water. The mixed solution was added to 4.98 g of Catalyst B by incipient wetness impregnation technique. The Pt-impregnated sample was calcined in dry air at 520° C. for 4 hours and the final material with 70 ppmw Pt and 1% Ga on alumina-phosphate is designated Catalyst D.

EXAMPLE 5

0.379 g of 0.15 wt % Pt solution prepared from $Pt(NH_3)_4(NO_3)_2$ and 0.312 g $Ga(NO_3)_3$ salt was added into 6.57 g water. The mixed solution was added to 6.37 g of amorphous alumina phosphate support (with BET surface area of 134 $m^2/g$ and Al/P atomic ratio of 1.11) by incipient wetness impregnation technique. The impregnated sample was calcined in dry air at 750C for 4 hours and the final material with 100 ppmw Pt and 1.5% Ga on alumina-phosphate is designated Catalyst E.

EXAMPLE 6

0.654 g of Ga(NO$_3$)$_3$ hydrate crystal (at 17 wt % Ga) and 0.681 g of EDTA were dissolved in 13.5 g H$_2$O. 7.95 g of ammonium hydroxide solution (at 29 wt %) was added to adjust the mixture pH to 9.3 at 25° C. The Ga-EDTA solution was then combined with 0.53 g of Pt(NH$_3$)$_4$(NO$_3$)$_2$ solution (at 0.15 wt % Pt) and loaded in a small rotary evaporator. 7.90 g of amorphous alumina phosphate support (with BET surface area of 128 m$^2$/g and Al/P atomic ratio of 1.03) was pre-calcined in dry air at 750 C for 1 hour, cooled down to room temperature and added into the solution. The rotary evaporator rotated for 30 minutes at room temperature, followed by drying with jacketed ambient-pressure steam. The dried material was calcined in dry air at 750 C for 2 hours, and the final material with 100 ppmw Pt and 1.4 wt % Ga on alumina-phosphate is designated Catalyst F.

EXAMPLE 7

A catalyst with 50 ppmw Pt and 0.7 wt % Ga on alumina-phosphate was prepared according to Example 6 preparation procedures and conditions except Pt and Ga loading were adjusted to obtain 50 ppmw Pt and 0.7 wt % Ga on alumina-phosphate, and the calcination after impregnation was carried out at 675 C. The catalyst is designated Catalyst G.

EXAMPLE 8

0.618 g of Ga(NO$_3$)$_3$ hydrate crystal (at 17 wt % Ga) and 0.643 g of EDTA were dissolved in 14.7 g H$_2$O. 12.13 g of ammonium hydroxide solution (at 29 wt %) was added to adjust the mixture pH to 9.3 at 25 C. The Ga-EDTA solution was then combined with 0.50 g of Pt(NH$_3$)$_4$(NO$_3$)$_2$ solution (at 0.15 wt % Pt) and loaded in a small rotary evaporator. 12.8 g of amorphous silica-alumina-phosphate support (with BET surface area of 169m$^2$/g, 1.18 wt % Si and Al/P atomic ratio of 1.04) was pre-calcined in dry air at 750° C. for 1 hour, cooled down to room temperature and added into the solution. The rotary evaporator rotated for 30 minutes at room temperature, followed by drying with jacketed ambient-pressure steam. The dried material was calcined in dry air at 750° C. for 2 hours, and the final material with 59 ppmw Pt and 0.82 wt % Ga on silica-alumina-phosphate is designated Catalyst H.

EXAMPLE 9

The amorphous alumina phosphate support used in Example 5 was calcined under the same condition used in preparation of Catalyst E in Example 5, but without adding any metal component. The resulting sample is designated Calcined Support I. X-ray powder diffraction (XRD) analysis with a copper anode x-ray tube was conducted on alumina phosphate support before the calcination and on Calcined Support I. Powder XRD patterns of the alumina phosphate support before and after calcination showed no diffraction peaks and only board background signal consistent with amorphous material.

EXAMPLE 10

Catalyst performance evaluation system: catalyst evaluation was carried out in a fixed-bed reactor system at 20 hr-1 weight-hourly space velocity (WHSV), 620° C., and ambient pressure with a propane feed. 250 mg of a catalyst was loaded in a quartz reactor with 4 mm ID. The void space above and below the catalyst bed was filled with inert alpha alumina spheres (corundum structure Al$_2$O$_3$, approximate diameter ~2 mm) to reduce background conversion caused by thermal cracking. The catalyst was pretreated in a nitrogen atmosphere at 620° C. for 15 minutes before the propane feed was switched into the reactor. The reaction products were analyzed by Gas chromatograph.

Table 1 compares the background conversion caused by thermal cracking in the catalyst evaluation system (obtained with inert alpha alumina filling the entire reactor) with the level of conversion observed when Calcined Support I was tested.

TABLE 1

(comparison of Calcined Support I against background conversion)

| Sample Loading | Propane conversion (%) | |
|---|---|---|
| | at 0.62 min | at 40 min |
| Calcined Support I | 0.58% | 0.51% |
| Background | 0.56% | 0.54% |

The result showed no appreciable conversion (including catalytic cracking) by the calcined support, as evidence of the non-acidic nature of support.

Table 2 compares the performance of propane dehydrogenation evaluated by the catalyst performance evaluation system over Catalysts A through H. Table 1 includes the propane conversion (%) and propylene selectivity (mol %) at 0.62 min after feed contacting catalyst.

TABLE 2

(Performance comparison of Catalyst A through H)

| Catalysts | Target Ga wt % | Target Pt wt % | Support | Calcination Temperature, C. | Propane conversion (%) at 0.62 min | Propylene selectivity (mol %) at 0.62 min |
|---|---|---|---|---|---|---|
| A | 1 | \ | alumina-phosphate | 607 | 19.8% | 97.7% |
| B | 1 | \ | alumina-phosphate | 750 | 25.5% | 98.8% |
| C | 1 | \ | alumina-phosphate | 900 | 1.9% | 87.0% |
| D | 1 | 0.007 | alumina-phosphate | 750/520 | 48.1% | 98.9% |

TABLE 2-continued (Performance comparison of Catalyst A through H)

| Catalysts | Target Ga wt % | Target Pt wt % | Support | Calcination Temperature, C. | Propane conversion (%) at 0.62 min | Propylene selectivity (mol %) at 0.62 min |
|---|---|---|---|---|---|---|
| E | 1.5 | 0.01 | alumina-phosphate | 750 | 39.3% | 98.7% |
| F | 1.4 | 0.01 | alumina-phosphate | 750 | 47.0% | 98.8% |
| G | 0.7 | 0.005 | alumina-phosphate | 675 | 52.0% | 98.7% |
| H | 0.82 | 0.0059 | silica-alumina-phosphate | 750 | 49.9% | 98.9% |

The invention claimed is:

1. A de-hydrogenation catalyst comprising gallium on an essentially non-acidic and amorphous alumina-phosphate or silica-alumina-phosphate support with an empirical chemical composition of $[Al2O3][SiO2]Y[P2O5]_Z$, wherein Y is between 0 and 0.2 and Z is between 0.01 and 1.1, with a BET surface area above 50 $m^2/g$, as measured by $N_2$ adsorption experiment.

2. The catalyst of claim 1 further comprising platinum.

3. The catalyst of claim 2 comprising 1 to 500 ppm by weight platinum.

4. The catalyst of claim 2 comprising about 0.25 to 1.5 wt % gallium and about 20 ppm to 100 ppm by weight platinum.

5. The catalyst of claim 2 with an atomic ratio of Ga/Pt between 140 and 4500.

6. The catalyst of claim 2 having an atomic ratio of Ga/Pt between 200 and 500.

7. A method of preparing the catalyst of claim 2 comprising impregnating an alumina-phosphate or a silica-alumina-phosphate support with a solution containing gallium and platinum.

8. The method of claim 7 further comprising calcining the catalyst in wet or dry air at a temperature of about 600° C. to 900° C.

9. A method of preparing the catalyst of claim 2 comprising separate steps of impregnating a gallium containing solution and a platinum containing solution on the alumina-phosphate or silica-alumina-phosphate support.

10. The catalyst of claim 1 comprising 0.05-2.5 wt % gallium.

11. A process for dehydrogenating a hydrocarbon comprising:

contacting a gaseous stream consisting of at least one dehydrogenatable hydrocarbon selected from paraffinic hydrocarbons having from 2 to 20 carbons, alkylaromatic hydrocarbons having from 8 to 20 carbons, and mixtures thereof, hydrogen produced in situ by the dehydrogenation and a carrier fluid selected from the group consisting of one of the reactants in gaseous form, nitrogen, hydrocarbons, carbon dioxide, and argon; or at least one dehydrogenatable hydrocarbon selected from paraffinic hydrocarbons having from 2 to 20 carbons, alkylaromatic hydrocarbons having from 8 to 20 carbons, and mixtures thereof and hydrogen produced in situ by the dehydrogenation, in a dehydrogenation reactor with a supported dehydrogenation catalyst comprising gallium on an essentially non-acidic and amorphous alumina-phosphate or silica-alumina-phosphate support with the empirical chemical composition of $[Al2O3][SiO2]Y[P2O5]_Z$, in which Y is between 0 and 0.2 and Z is between 0.01 and 1.1, with a BET surface area above 50 $m^2/g$, as measured by $N_2$ adsorption experiment.

12. The process of claim 11 wherein said supported dehydrogenation catalyst further comprises platinum.

13. The process of claim 11 wherein said supported dehydrogenation catalyst comprises 0.05-2.5 wt % gallium.

14. The process of claim 11 wherein said supported dehydrogenation catalyst comprises 1 to 500 ppm by weight platinum.

15. The process of claim 11 wherein the dehydrogenation operates at a temperature of from 400° to about 900° C.

16. The process of claim 11 wherein the dehydrogenation operates at a pressure of 0.01 to 10 atmospheres.

* * * * *